United States Patent
Raj et al.

(10) Patent No.: US 9,141,454 B2
(45) Date of Patent: Sep. 22, 2015

(54) SIGNALING SOFTWARE RECOVERABLE ERRORS

(71) Applicant: Intel Corporation, Santa Clara, CA (US)

(72) Inventors: Ashok Raj, Portland, OR (US); John G. Holm, Beaverton, OR (US); Gilbert Neiger, Hillsboro, OR (US); Rajesh M. Sankaran, Portland, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 13/728,217

(22) Filed: Dec. 27, 2012

(65) Prior Publication Data
US 2014/0189445 A1    Jul. 3, 2014

(51) Int. Cl.
*G06F 11/00*    (2006.01)
*G06F 11/07*    (2006.01)

(52) U.S. Cl.
CPC .......... *G06F 11/006* (2013.01); *G06F 11/0715* (2013.01); *G06F 11/0772* (2013.01); *G06F 11/0793* (2013.01)

(58) Field of Classification Search
CPC .............. G06F 11/073; G06F 11/0793; G06F 11/0769; G06F 11/1076; G06F 11/0748; G06F 11/327; G06F 11/0709; G11B 20/18
USPC ..................................................... 714/54, 57
See application file for complete search history.

(56) References Cited

U.S. PATENT DOCUMENTS

| | | | |
|---|---|---|---|
| 2003/0074601 A1* | 4/2003 | Schultz et al. | 714/15 |
| 2003/0126186 A1* | 7/2003 | Rodgers et al. | 709/107 |
| 2004/0267996 A1* | 12/2004 | Hammarlund et al. | 710/200 |
| 2006/0107125 A1* | 5/2006 | Hsu et al. | 714/100 |
| 2007/0143287 A1* | 6/2007 | Adl-tabatabai et al. | 707/8 |
| 2008/0082711 A1 | 4/2008 | Wang et al. | |
| 2008/0134000 A1 | 6/2008 | Wiatrowski et al. | |
| 2009/0158012 A1* | 6/2009 | Hansen et al. | 712/222 |
| 2012/0144245 A1 | 6/2012 | Fan et al. | |
| 2014/0281092 A1* | 9/2014 | Jayakumar et al. | 710/269 |

FOREIGN PATENT DOCUMENTS

WO    2014/105158 A1    7/2014

OTHER PUBLICATIONS

International Search Report and Written Opinion received for PCT Patent Application No. PCT/US2013/047311, mailed on Oct. 7, 2013, 10 pages.

* cited by examiner

*Primary Examiner* — Yair Leibovich
(74) *Attorney, Agent, or Firm* — Thomas R. Lane

(57) ABSTRACT

Embodiments of an invention for signaling software recoverable errors are disclosed. In one embodiment, a processor includes a first unit, a programmable indicator, and a second unit. The first unit is to detect a poison error. The programmable indicator is to indicate whether the poison error is signaled as a machine check error or as one of a fault and a system management interrupt. The second unit is to signal the poison error as one of a fault and a system management error responsive to the programmable indicator.

18 Claims, 6 Drawing Sheets

METHOD 600

METHOD 400

METHOD 500

METHOD 600

SIGNALING SOFTWARE RECOVERABLE ERRORS

BACKGROUND

1. Field

The present disclosure pertains to the field of information processing, and more particularly, to the field of reliability in information processing systems.

2. Description of Related Art

Reliability is of great importance in some information processing systems. Therefore, various techniques have been developed to signal the existence of an error in an information processing system. One such technique is the use of a Machine Check Exception (MCE) in various processor families from Intel® Corporation.

BRIEF DESCRIPTION OF THE FIGURES

The present invention is illustrated by way of example and not limitation in the accompanying figures.

DETAILED DESCRIPTION

Embodiments of an invention for signaling software recoverable errors are described. In this description, various specific details, such as component and system configurations, may be set forth in order to provide a more thorough understanding of the present invention. It will be appreciated, however, by one skilled in the art, that the invention may be practiced without such specific details. Additionally, to avoid unnecessarily obscuring the present invention, some well-known structures, circuits, and other features have not been shown in detail.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner.

Also, the terms "bits," "flags," "fields," "entries," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

As referred to in the background section, various processor families from Intel® Corporation provide for a Machine Check Architecture (MCA) approach to signaling the existence of an error in an information processing system. Embodiments of the present invention may provide for the signaling of some errors (including but not limited to errors capable of being signaled using an MCA approach), such as software recoverable errors, in a manner that may reduce the frequency of system shutdowns.

Figure 1:
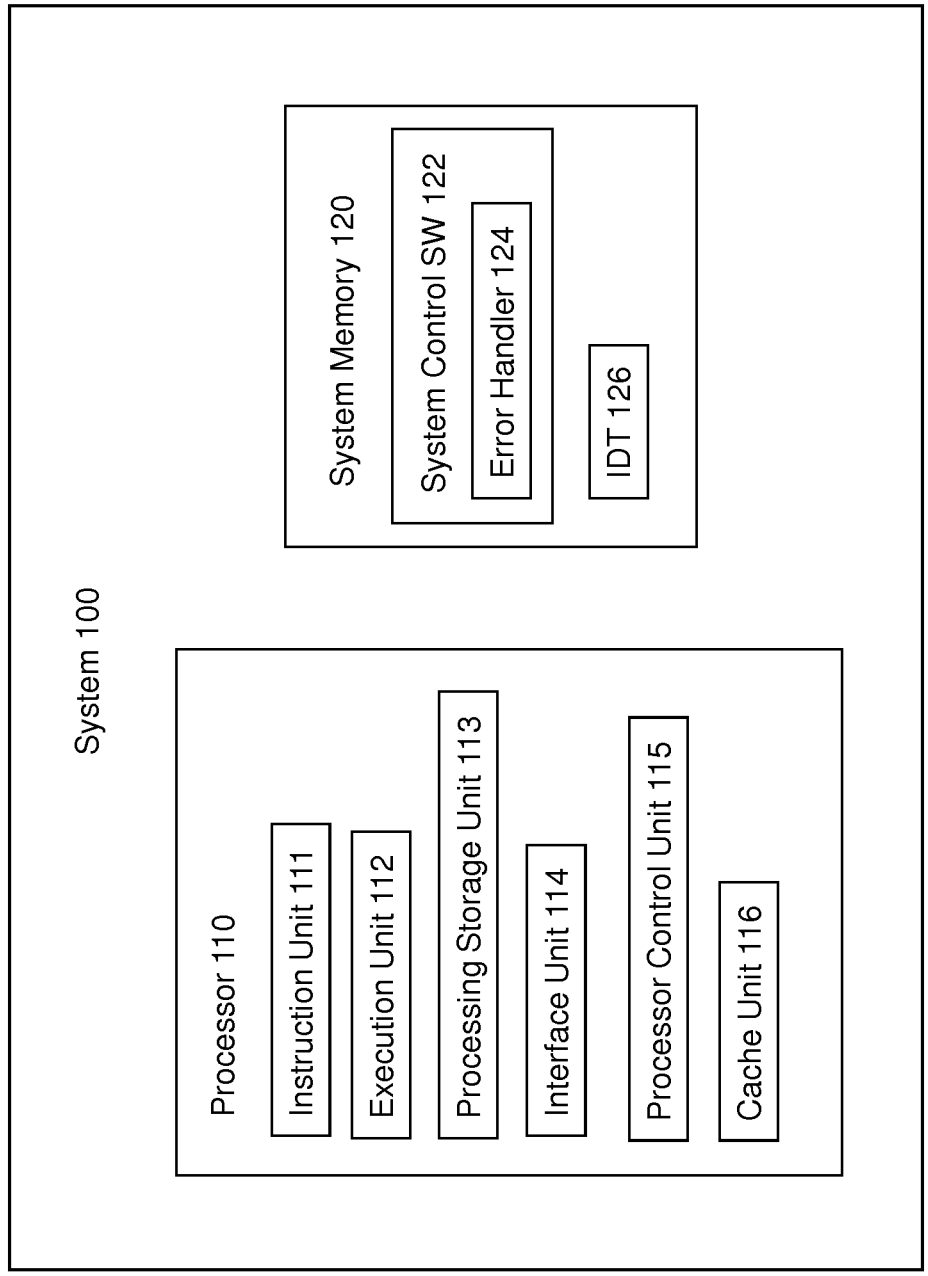
FIG. 1 illustrates a system providing for signaling software recoverable errors according to an embodiment of the present invention.

FIG. 1 illustrates system 100, an information processing system providing for signaling software recoverable errors according to an embodiment of the present invention. System 100 may represent any type of information processing system, such as a server, a desktop computer, a portable computer, a set-top box, a hand-held device, or an embedded control system. System 100 includes processor 110 and system memory 120. Systems embodying the present invention may include any number of each of these components and any other components or other elements, such as information storage devices, peripherals, and input/output devices. Any or all of the components or other elements in this or any system embodiment, may be connected, coupled, or otherwise in communication with each other through any number of buses, point-to-point, or other wired or wireless interfaces or connections, unless specified otherwise.

Processor 110 may represent one or more processors integrated on a single substrate or packaged within a single package, each of which may include multiple threads and/or multiple execution cores, in any combination. Each processor represented as processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller. Processor 110 may include instruction unit 111, execution unit 112, processing storage unit 113, interface unit 114, processor control unit 115, and cache unit 116. Processor 110 may also include any other circuitry, structures, or logic not shown in FIG. 1, and/or any circuitry, structures, or logic shown or described as elsewhere in FIG. 1.

Instruction unit 111 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution unit 112.

Execution unit 112 may include any circuitry, structure, or other hardware, such as an arithmetic unit, logic unit, floating point unit, shifter, etc., for processing data and executing instructions, micro-instructions, and/or micro-operations.

Processing storage unit 113 may represent any type of storage usable for any purpose within processor 110; for example, it may include any number of data registers, instruction registers, status registers, configuration registers, control registers, other programmable or hard-coded registers or register files, or any other storage structures.

Interface unit 114 may represent any circuitry, structure, or other hardware, such as a bus unit, messaging unit, or any other unit, port, or interface, to allow processor 110 to communicate with other components in system 100 through any type of bus, point to point, or other connection, directly or through any other component, such as a memory controller or a bus bridge.

Processor control unit 115 may include any logic, microcode, circuitry, or other hardware to control the operation of the units and other elements of processor 110 and the transfer of data within, into, and out of processor 110. Processor control unit 115 may cause processor 110 to perform or participate in the performance of method embodiments of the present invention, such as the method embodiments described below, for example, by causing processor 110 to execute instructions received by instruction unit 111 and micro-instructions or micro-operations derived from instructions received by instruction unit 111.

Cache unit 116 may include any one or more levels of cache memory in a memory hierarchy of information processing system 100, implemented in static random access memory or any other memory technology. Cache unit 116 may include any combination of cache memories dedicated to or shared among any one or more execution cores or processors within processor 110 according to any known approaches to caching in information processing systems.

System memory 120 may be dynamic random access memory or any other type of medium readable by processor 110, and may be used to store system control software 122, such as an operating system (OS) or a virtual machine monitor (VMM), including error handler 124. System memory 120 may also be used to store a data structure (e.g. interrupt descriptor table or IDT 126) to provide, directly or indirectly, the locations of handlers for different varieties of errors, interrupts, or exceptions.

Figure 2:
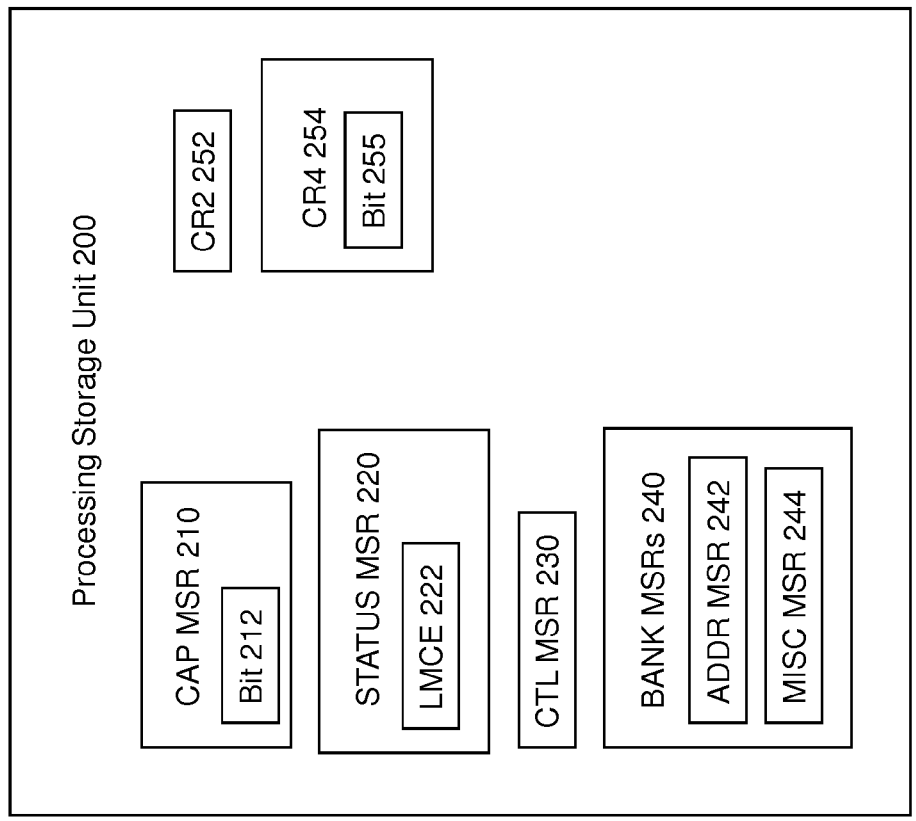
FIG. 2 illustrates a processing storage unit according to an embodiment of the present invention.

FIG. 2 illustrates processing storage unit 200, an embodiment of which may serve as processing storage unit 113 in processor 110. Processing storage unit 200 includes a number of model specific registers (MSRs) which may be used for error signaling, including a capabilities register (CAP MSR 210), a status register (STATUS MSR 220), a control register (CTL MSR 230), and one or more banks of error reporting registers (BANK MSRs 240). CAP MSR 210 may be used to provide information about the error signaling capabilities (e.g., according to an MCA and/or other approach) of processor 110. STAT MSR 220 may be used to describe the state of processor 110 at the time an error is signaled (e.g., using an MCE and/or other means). CTL MSR 230 may be used to control the signaling of an error. Each bank of BANK MSRs 240 may be used to for controlling the signaling of errors and reporting error information for a particular hardware unit or group of units in processor 110. The information reported in BANK MSRs 240 may include information regarding the severity of the error (e.g., whether the error is corrected or uncorrected), a pointer to the instruction that triggered the error, an indication as to whether software may be used to recover from the error, a location (e.g., a system of physical memory address) of the error, and information that may be used to identify the logical processor that observed the error. For example, each bank of BANK MSRs 240 may include an ADDR MSR 242 and a MISC MSR 244, where ADDR MSR 242 may be used to store an address and MISC MSR 244 may be used to store (e.g., in bits [8:6]) an addressing mode, which may be used in embodiments of the present invention as described below. Processing storage unit 200 may also include other storage locations or control or other registers (e.g., CR2 252 and CR4 254) that may be used within embodiments of the present invention.

Figure 3:
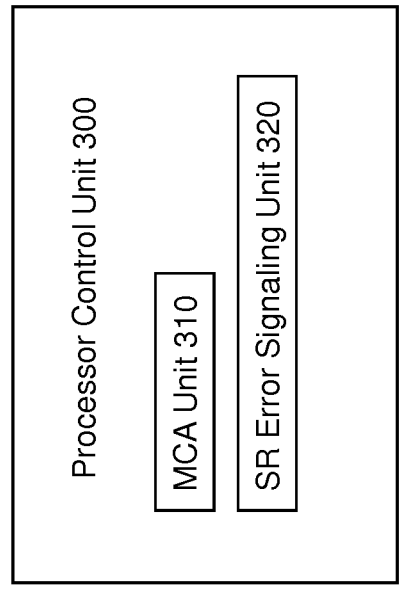
FIG. 3 illustrates a processor control unit according to an embodiment of the present invention.

FIG. 3 illustrates processor control unit 300, an embodiment of which may serve as processor control unit 115 in processor 110. Processor control unit 300 includes MCA unit 310 and software recoverable (SR) error signaling unit 320. MCA unit 310 may include microcode, logic, circuitry, and/or other hardware to control and implement error signaling according to an approach (e.g., MCA), including an approach in which for some errors a broadcast-type signal is sent to all processors in a multiprocessor system. SR error signaling unit 320 may include microcode, logic, circuitry, and/or other hardware to control and implement error signaling according to an approach in which error signaling may be performed in a way in that allows software (e.g., an OS or VMM) to recover from the error instead of or before the sending of a broadcast-type signal. For example, embodiments of the present invention may provide for signaling an error as a fault instead of an abort. Some or all of the microcode, logic, circuitry, and/or other hardware in SR error signaling unit 320 may be shared or implemented together with microcode, logic, circuitry, and/or other hardware in MCA unit 310, and SR error signaling unit 320 may represent specific modifications and/or additions to MCA unit 310 rather than an entirely separate control unit.

An error in system 100 may involve the detection of an error in the contents of a location in system memory 120 or other location in system 100. In this case, the error may be handled by hardware, firmware, or software by correcting the error or by marking as "poisoned" the location or a larger region including the location. Then, a subsequent attempt to access the location, whether as part of an instruction fetch or a data read or write, may result in a "poison" error to prevent the system from using an erroneous instruction or data. Some approaches to error signaling may result in a system shutdown in the event that two system error signals (e.g., MCEs) exist at the same time. However, two system error signals may exist at the same time from a single error source, for example, from the detection (or re-detection) of an error in a poisoned location through a periodic scrubbing of memory (e.g., a patrol scrub error) by a memory controller in a first processor package and an attempt from a last level cache in a second processor package to write to the same poisoned location (e.g., an explicit write back error). Therefore, embodiments of the present invention may provide for recovery from multiple poison or other errors without system shutdown.

The capability of processor 110 to support one or more features of one or more embodiments of the present invention may be indicated by one or more indicators in processing storage unit 200 or elsewhere in processor 110. For example, bit 212 in CAP MSR 210 may be used to indicate that a particular feature of an embodiment of the present invention is supported by processor 110. Also, one or more programmable indicators may be provided in processing storage unit 200 or elsewhere in processor 110 for software to use to enable one or more such features. For example, bit 255 in CR4 254 may be used to enable a particular feature of an embodiment of the present invention.

Figure 4:
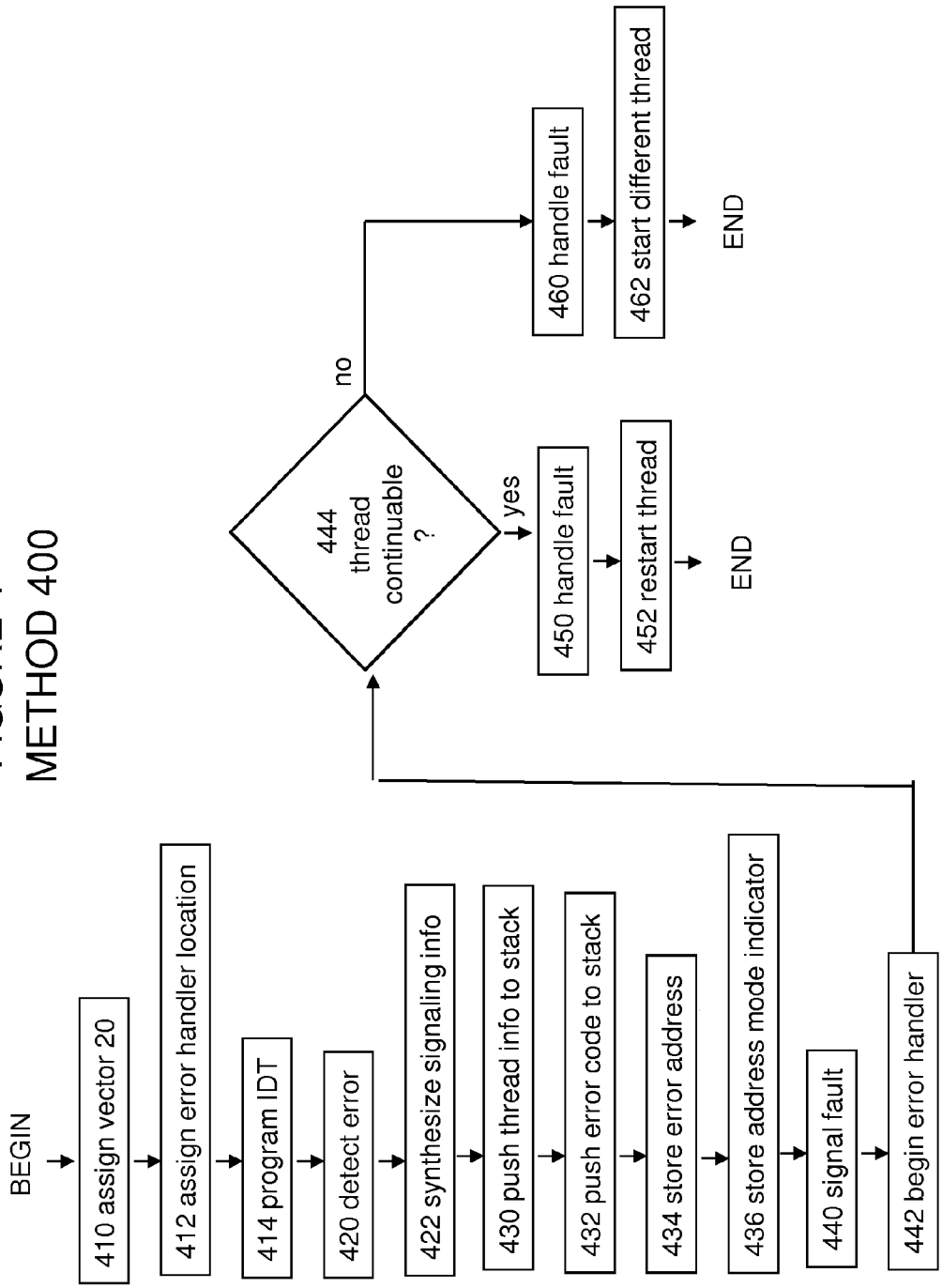
FIGS. 4, 5, and 6 illustrate methods for signaling software recoverable errors according to embodiments of the present invention.
Figure 5:
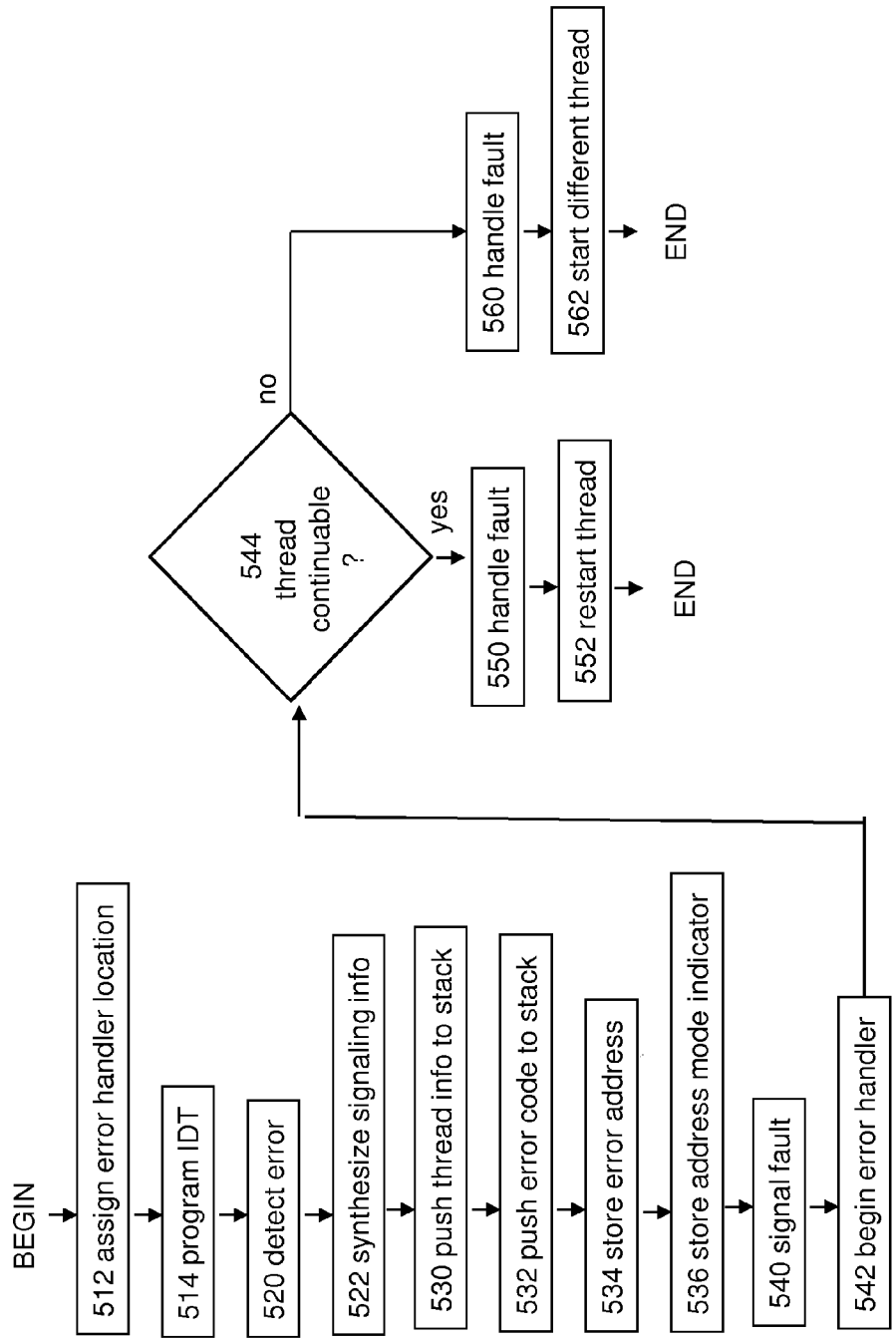
Figure 6:
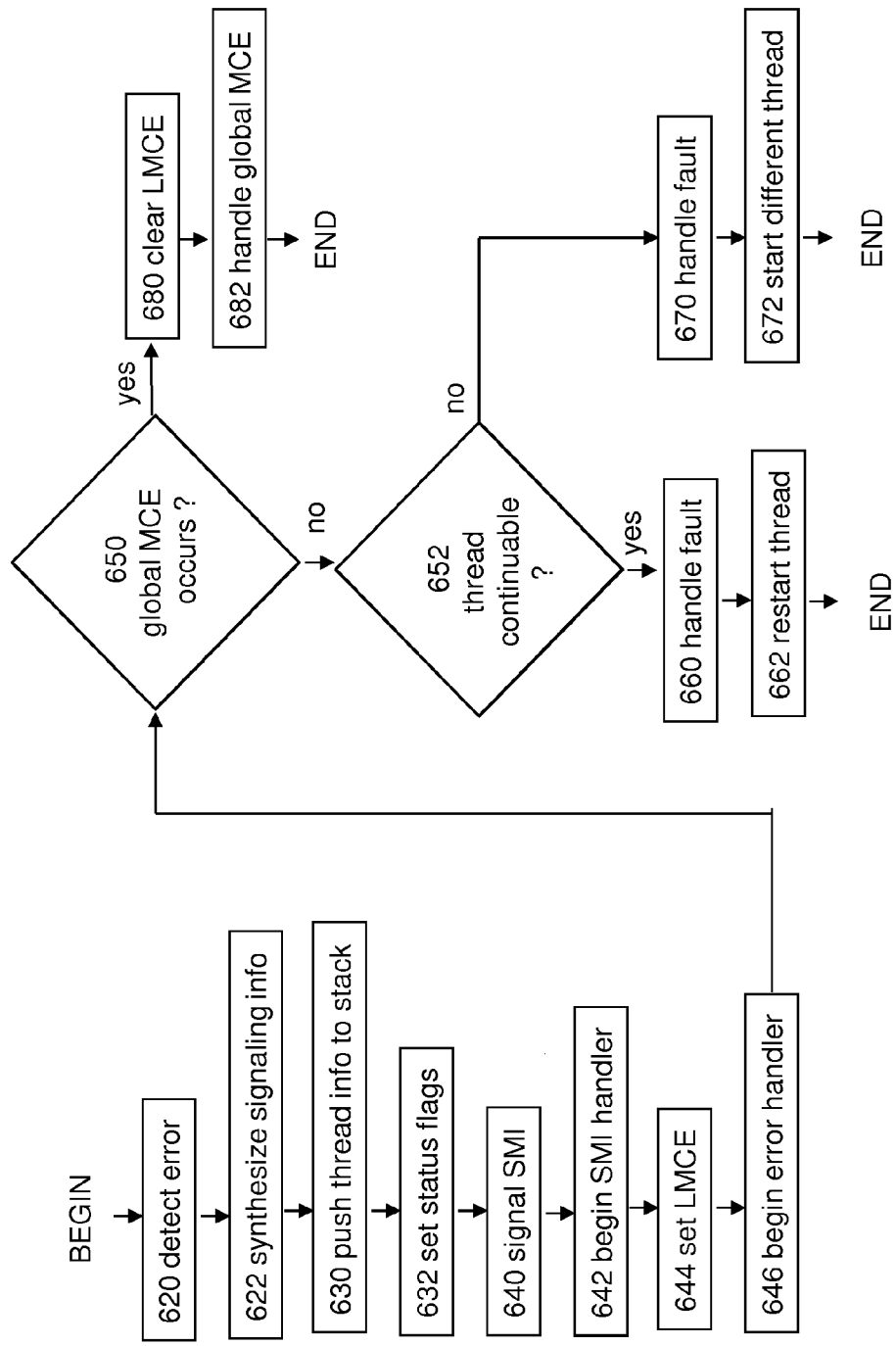

FIGS. 4, 5, and 6 illustrate methods 400, 500, and 600, respectively, for signaling software recoverable errors according to an embodiment of the present invention. Although method embodiments of the invention are not limited in this respect, reference may be made to elements of FIGS. 1, 2, and 3 to help describe the method embodiments of FIGS. 4, 5, and 6.

Method 400 of FIG. 4 represents a method of signaling a software recoverable error as a fault according to an embodiment of the present invention. In box 410, an identification number (e.g., vector 20) is assigned to a variety of error to be signaled as a fault according to an embodiment. In box 412, an error handler (e.g., error handler 124) to handle this variety of error is assigned to a particular memory location in the memory space of system 100. In box 414, a data structure (e.g., IDT 126) is programmed with the identification number and the information needed to find the error handler.

In box 420, an error to which vector 20 has been assigned is detected during the execution of an instruction thread by processor 110. The error may be detected by any unit within processor 110. For example, the error may be detected by instruction unit 111 when it attempts to fetch an instruction from a poisoned location or by execution unit 112 or cache unit 116 when it attempts to read from or write to a poisoned location. In box 422, processor 100 (e.g., processor control unit 115) synthesizes information (as described below) to signal the detection of the error.

In box 430, processor 110 saves information regarding the executing thread to a data structure accessible by the error handler. For example, processor 110 may push this information onto the stack of the error handler. Therefore, saving information to a data structure may be referred to as pushing the information onto a stack; however, embodiments of the present invention are not limited to using a stack as the data structure accessible to the error handler. The information saved in box 430 may include information to be used by the error handler to restart the thread at the faulting instruction, such as a segment selector and pointer to the thread's stack (e.g., contents of SS and RSP), status of the thread (e.g., contents of RFLAGS), and a segment selector and pointer to the instruction (e.g., contents of CS and RIP).

In box 432, processor 110 pushes an error code to the error handler's stack. The error code may include a bit to indicate whether to the access causing the fault was a read or write (e.g., bit 0), a bit to indicate whether the access causing the fault originated when the processor was executing in user or supervisor mode (e.g., bit 1), a bit to indicate whether the fault was experienced during an instruction fetch or a data access (e.g., bit 2), and a bit to indicate whether the context of the thread that experienced the fault is corrupted and therefore not continuable (e.g., bit 3). An example of a thread that is not continuable may be one in which data stores have been made that cannot be traced back.

In box 434, processor 110 stores the address that was accessed to cause the fault. Processor 110 may store this address in any storage location accessible to the error handler, for example, in the ADDR MSR 242 for the unit detecting the fault. In box 436, processor 110 stores an indication of whether the address stored in box 434 is a physical address or a virtual address. Processor 110 may store this indicator in any storage location accessible to the error handler, for example, in the MISC MSR 244 for the unit detecting the fault.

In box 440, processor 110 signals, according to any known approach for signaling exceptions, a fault corresponding to vector 20. In box 442, error handler 124 begins to handle the fault. In box 444, error handler 124 determines (e.g., from bit 3 of the error code) whether the thread is continuable after the fault is handled. If so, then method 400 continues in box 450. If not, then method 400 continues in box 460.

In box 450, error handler 124 finishes handling the fault. In box 452, error handler 124 restarts the thread that attempted to execute the faulting instruction.

In box 460, error handler 124 finishes handling the fault. In box 462, error handler 124 terminates the thread that attempted to execute the faulting instruction and schedules a different thread for execution on processor 110.

Method 500 of FIG. 5 represents a method of signaling a software recoverable error as a page fault according to an embodiment of the present invention. In box 512, an error handler (e.g., error handler 124) to handle this variety of error along with a page fault is assigned to a particular memory location in the memory space of system 100. In box 514, a data structure (e.g., IDT 126) is programmed with the identification number and the information needed to find the error handler.

In box 520, an error of this variety is detected during the execution of an instruction thread by processor 110. The error may be detected by any unit within processor 110. For example, the error may be detected by instruction unit 111 when it attempts to fetch an instruction from a poisoned location or by execution unit 112 or cache unit 116 when it attempts to read from or write to a poisoned location. In box 522, processor 100 (e.g., processor control unit 115) synthesizes information (as described below) to signal the detection of the error.

In box 530, processor 110 saves information regarding the executing thread to a data structure accessible by the error handler. For example, processor 110 may push this information onto the stack of the error handler. Therefore, saving information to a data structure may be referred to as pushing the information onto a stack; however, embodiments of the present invention are not limited to using a stack as the data structure accessible to the error handler. The information saved in box 530 may include information to be used by the error handler to restart the thread at the faulting instruction, such as a segment selector and pointer to the thread's stack (e.g., contents of SS and RSP), status of the thread (e.g., contents of RFLAGS), and a segment selector and pointer to the instruction (e.g., contents of CS and RIP).

In box 532, processor 110 pushes an error code to the error handler's stack. The error code may include a bit to indicate whether to the access causing the fault was a read or write (e.g., bit 1), a bit to indicate whether the access causing the fault originated when the processor was executing in user or supervisor mode (e.g., bit 2), a bit to indicate whether the fault was experienced during an instruction fetch or a data access (e.g., bit 4), a bit to indicate whether the fault was caused by an attempt to access a poisoned location or a page fault (e.g., bit 5), and a bit to indicate whether the context of the thread that experienced the fault is corrupted and therefore not continuable (e.g., bit 6). An example of a thread that is not continuable may be one in which data stores have been made that cannot be traced back.

In box 534, processor 110 stores the address that was accessed to cause the fault. Processor 110 may store this address in any storage location accessible to the error handler, for example, in CR2. In box 536, processor 110 stores an indication of whether the address stored in box 434 is a physical address or a virtual address. Processor 110 may store this indicator in any storage location accessible to the error handler or may include it in the error code pushed to the stack in box 532.

In box 540, processor 110 signals, according to any known approach for signaling exceptions, a page fault (e.g., an exception corresponding to vector 14). In box 542, error handler 124 begins to handle the fault. In box 544, error handler 124 determines (e.g., from bit 6 of the error code) whether the thread is continuable after the fault is handled. If so, then method 500 continues in box 550. If not, then method 500 continues in box 560.

In box 550, error handler 124 finishes handling the fault. In box 552, error handler 124 restarts the thread that attempted to execute the faulting instruction.

In box 560, error handler 124 finishes handling the fault. In box 562, error handler 124 terminates the thread that attempted to execute the faulting instruction and schedules a different thread for execution on processor 110.

Method 600 of FIG. 6 represents a method of signaling a software recoverable error as a System Management Interrupt (SMI) according to an embodiment of the present invention.

In box 620, an error to be handled according to an embodiment of the present invention is detected during the execution of an instruction thread by processor 110. The error may be detected by any unit within processor 110. For example, the error may be detected by instruction unit 111 when it attempts to fetch an instruction from a poisoned location or by execution unit 112 or cache unit 116 when it attempts to read from or write to a poisoned location. In box 622, processor 100 (e.g., processor control unit 115) synthesizes information (as described below) to signal the detection of the error.

In box 630, processor 110 saves information regarding the executing thread to a data structure accessible by the error handler. For example, processor 110 may push this information onto the stack of the error handler. Therefore, saving information to a data structure may be referred to as pushing the information onto a stack; however, embodiments of the present invention are not limited to using a stack as the data structure accessible to the error handler. The information saved in box 630 may include information to be used by the error handler to restart the thread at the faulting instruction, such as a segment selector and pointer to the thread's stack (e.g., contents of SS and RSP), status of the thread (e.g., contents of RFLAGS), and a segment selector and pointer to the instruction (e.g., contents of CS and RIP).

In box 632, processor 110 sets flags in a register accessible to an SMI handler and error handler 124 to indicate the status of the error. For example, processor 110 may set these flags in STATUS MSR 220. The flags may include a flag (e.g., bit 0 or RIPV) to indicate whether to the thread is reliably continuable at the instruction pointed to by the instruction pointer pushed onto the stack, a flag (e.g., bit 1 or EIPV) to indicate whether the instruction pointed to by the instruction pointer pushed onto the stack is directly associated with the error, and a flag (e.g., bit 2 or MCIP) to indicate that an MCE was generated.

In box 640, processor 110 signals an SMI. In box 642, the SMI handler begins to handle the fault. In box 644, the SMI handler sets a flag in processor 110, for example, bit 3 (LMCE 222) of STATUS MSR 220, to indicate that the error signal is local rather than global. In box 646, the SMI handler transfers control of processor 110 to error handler 124.

In box 650, if a global MCE occurs, then, in box 680, LMCE 222 is cleared to indicate delivery of a global MCE, and method 600 continues in box 682. If not, then method 600 continues in box 652.

In box 652, error handler 124 determines (e.g., from RIPV) whether the thread is continuable after the fault is handled. If so, then method 600 continues in box 660. If not, then method 600 continues in box 670.

In box 660, error handler 124 finishes handling the fault. In box 662, error handler 124 restarts the thread that attempted to execute the faulting instruction.

In box 670, error handler 124 finishes handling the fault. In box 672, error handler 124 terminates the thread that attempted to execute the faulting instruction and schedules a different thread for execution on processor 110.

In box 682, the global MCE is handled according to any known approach.

In various embodiments of the present invention, the methods illustrated in FIGS. 4, 5, and 6 may be performed in a different order, with illustrated boxes combined or omitted, with additional boxes added, or with a combination of reordered, combined, omitted, or additional boxes. Furthermore, many other method embodiments are possible within the scope of the present invention.

Embodiments or portions of embodiments of the present invention, as described above, may be stored on any form of a machine-readable medium. For example, all or part of methods 400, 500, and 600 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for signaling software recoverable errors have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
a first unit to detect a poison error;
a programmable indicator to determine whether the poison error is signaled as a machine check error or as one of a fault and a system management interrupt; and
a second unit to signal the poison error as one of a fault and a system management interrupt responsive to the programmable indicator and to store a continuability indicator to indicate whether an instruction thread including an instruction that caused the poison error is continuable.

2. The processor of claim 1, wherein the first unit is an instruction unit and the poison error is caused by an instruction fetch.

3. The processor of claim 1, wherein the first unit is one of an execution unit and a cache unit and the poison error is caused by a data access.

4. The processor of claim 1, wherein the poison error is signaled as a fault.

5. The processor of claim 1, wherein the poison error is signaled as a page fault.

6. The processor of claim 1, wherein the poison error is signaled as a system management interrupt.

7. A method comprising:
detecting a poison error;
determining whether to signal the poison error as a machine check error or as one of a fault and a system management interrupt responsive to a programmable indicator;
signaling the poison error as one of a fault and a system management interrupt; and storing an indicator to indicate whether an instruction thread including an instruction that caused the poison error is continuable.

8. The method of claim 7, further comprising signaling the poison error as a fault.

9. The method of claim 7, further comprising signaling the poison error as a page fault.

10. The method of claim 7, further comprising signaling the poison error as a system management interrupt.

11. The method of claim 7, further comprising saving an error code to data structure accessible to an error handler.

12. The method of claim 11, wherein the error code includes an indicator to indicate whether the poison error was caused by an instruction fetch or a data access.

13. The method of claim 11, further comprising storing an address of a location being accessed that caused the poison error.

14. The method of claim 13, further comprising storing an indicator to indicate whether the address is a physical address or a virtual address.

15. The method of claim 11, wherein the error code includes an indicator to indicate that the fault is a poison error rather than a page fault.

16. The method of claim 7, further comprising setting a flag to indicate that the signaling is local rather than global.

17. A system comprising:

a memory in which to store a handler to handle a poison error; and a processor including a first unit to detect the poison error, a programmable indicator to determine whether the poison error is signaled as a machine check error or as one of a fault and a system management interrupt, and a second unit to signal the poison error as one of a fault and a system management interrupt responsive to the programmable indicator and to store a continuability indicator in the memory to indicate whether an instruction thread including an instruction that caused the poison error is continuable.

18. The system of claim 17 wherein the handler is to restart the instruction thread responsive to the continuability indicator.

* * * * *